United States Patent
Wang et al.

(10) Patent No.: US 11,989,081 B2
(45) Date of Patent: May 21, 2024

(54) METHOD FOR CXL FALLBACK IN A CXL SYSTEM

(71) Applicant: DELL PRODUCTS L.P., Round Rock, TX (US)

(72) Inventors: Isaac Q. Wang, Austin, TX (US); Stuart Allen Berke, Austin, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 17/868,427

(22) Filed: Jul. 19, 2022

(65) Prior Publication Data

US 2024/0028438 A1    Jan. 25, 2024

Related U.S. Application Data (63) Continuation-in-part of application No. 17/863,540, filed on Jul. 13, 2022.

(51) Int. Cl.
*G06F 11/00* (2006.01)
*G06F 9/448* (2018.01)
*G06F 11/07* (2006.01)
*G06F 13/42* (2006.01)

(52) U.S. Cl.
CPC ........ *G06F 11/0772* (2013.01); *G06F 9/4498* (2018.02); *G06F 11/0778* (2013.01); *G06F 13/4221* (2013.01)

(58) Field of Classification Search
CPC ............. G06F 11/0772; G06F 11/0778; G06F 11/0745; G06F 11/1423; G06F 11/1625; G06F 11/221; G06F 11/3027; G06F 11/2247; G06F 11/3051; G06F 13/4221; G06F 9/4498
See application file for complete search history.

(56) References Cited

U.S. PATENT DOCUMENTS

| | | | |
|---|---|---|---|
| 10,620,963 B2 | 4/2020 | Warkentin et al. | |
| 11,226,919 B1 * | 1/2022 | Austin | G06F 11/0745 |
| 11,575,494 B1 * | 2/2023 | Kumar | H04L 43/0805 |
| 2016/0364243 A1 | 12/2016 | Puthillathe et al. | |
| 2019/0121417 A1 * | 4/2019 | Schneider | H04W 52/0229 |
| 2020/0341927 A1 * | 10/2020 | Luong | G06F 13/4027 |
| 2021/0232520 A1 * | 7/2021 | Choudhary | G06F 11/1048 |
| 2022/0200712 A1 * | 6/2022 | Lillie | H04W 24/08 |

OTHER PUBLICATIONS

Christopher Trick, What is PCIe (Peripheral Component Interconnect Express)?, Blogs by Trenton Systems, May 17, 2022, https://www.trentonsystems.com/blog/what-is-pcie, 14 pages (Year: 2022).*

* cited by examiner

*Primary Examiner* — Joseph D Manoskey
(74) *Attorney, Agent, or Firm* — Larson Newman, LLP (57) ABSTRACT

An information handling system includes a processor and a Compute express link (CXL) device. The CXL device is coupled to the processor by a Peripheral Component Interface-Express (PCIe)/CXL link. The processor initiates a link training on the PCIe/CXL link, determines that the PCIe/CXL link failed to train to a first data rate, trains the PCIe/CXL link to a second data rate in response to determining that the PCIe/CXL link failed to train to the first data rate, and operates the CXL device in a CXL mode in response to training the PCIe/CXL link to the second data rate.

20 Claims, 4 Drawing Sheets

METHOD FOR CXL FALLBACK IN A CXL SYSTEM

CROSS-REFERENCE TO RELATED APPLICATION

This application is a Continuation in part of U.S. patent application Ser. No. 17/863,540 entitled "METHOD FOR PCIE FALLBACK IN A CXL SYSTEM," filed Jul. 13, 2022, the disclosure of which is hereby expressly incorporated by reference in its entirety.

FIELD OF THE DISCLOSURE

This disclosure generally relates to information handling systems, and more particularly relates to providing for compute express link (CXL) fallback in a CXL information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a compute express link (CXL) device coupled to a processor by a peripheral component interface-express (PCIe)/CXL link. The processor may initiate a link training on the PCIe/CXL link, determine that the PCIe/CXL link failed to train to a first data rate, train the PCIe/CXL link to a second data rate in response to determining that the PCIe/CXL link failed to train to the first data rate, and operate the CXL device in a CXL mode in response to training the PCIe/CXL link to the second data rate.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
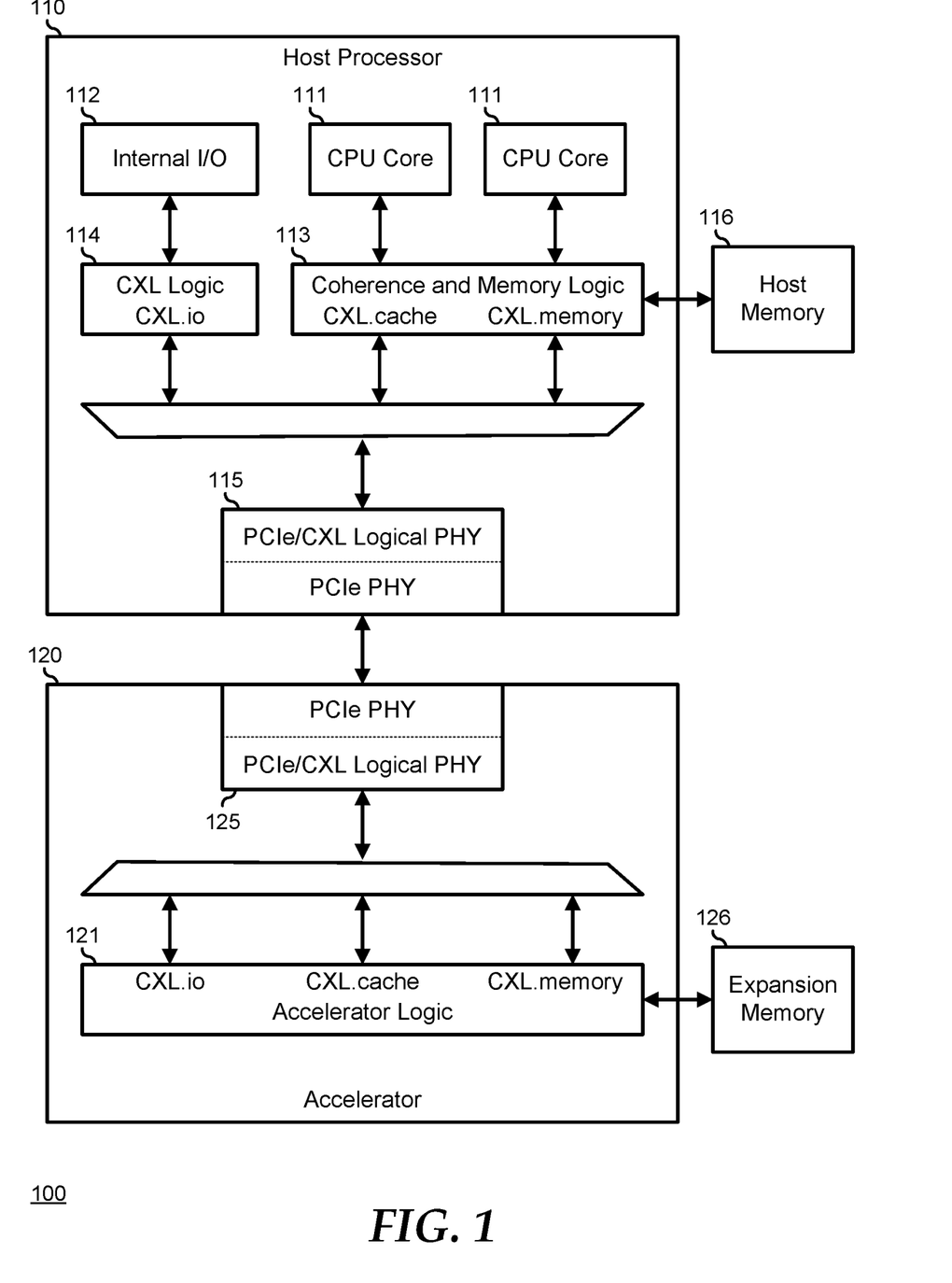
FIG. 1 is a block diagram of a compute express link (CXL) information handling system according to an embodiment of the current disclosure.

FIG. 1 shows an information handling system 100, including a host processor 110 with associated host memory 116, and an accelerator device 120 with associated expansion memory 126. Host processor 110 includes one or more processor core 111, various internal input/output (I/O) devices 112, coherence and memory logic 113, compute express link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart network interface card (MC) or host bus adapter (HBA), a graphics processing unit (GPU), field programmable gate array (FPGA), or application specific integrated circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a direct memory access (DMA) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a CXL standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1 and 2.0) or the PCIe 6.0 protocol (for CXL specification 3.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

In a particular embodiment, the CXL standard provides for the initialization of information handling system 100 with a heavy reliance on existing PCIe device and link initialization processes. In particular, when information handling system 100 is powered on, the PCIe device enumeration process operates to identify accelerator 120 as a CXL device, and that the operations of the accelerator, in addition to providing for standard PCIe operation, functions, and features, may be understood to provide for additional CXL operation, functions, and features. For example, accelerator 120 enables CXL features such as global memory flush, CXL reliability, availability, and serviceability (RAS) features, CXL metadata support, and the like. In addition to the enablement of the various CXL operation, functions, and features, accelerator 120 will be understood to enable operations at higher interface signaling rates, such as 16 gigatransfers per second (GT/s) or 32 GT/s.

However, currently specified versions of the CXL standard do not provide for any fallback provisions in cases where a CXL device fails to initialize at the requisite signaling rate. For example, if, during link training, a PCIe device fails to train to the highest available signaling rate, the PCIe standard permits retraining at lower signaling rates (such as from 16 GT/s to 8 GT/s or slower) or with lower link width (such as from x16 link width to x8 link width or lower). In contrast, if a CXL device fails to initialize at, for example 8 GT/s or higher, the link training is halted and the CXL device is reported as having failed to initialize, and the CXL device is not therefore utilized in the particular information handling system.

Figure 2:
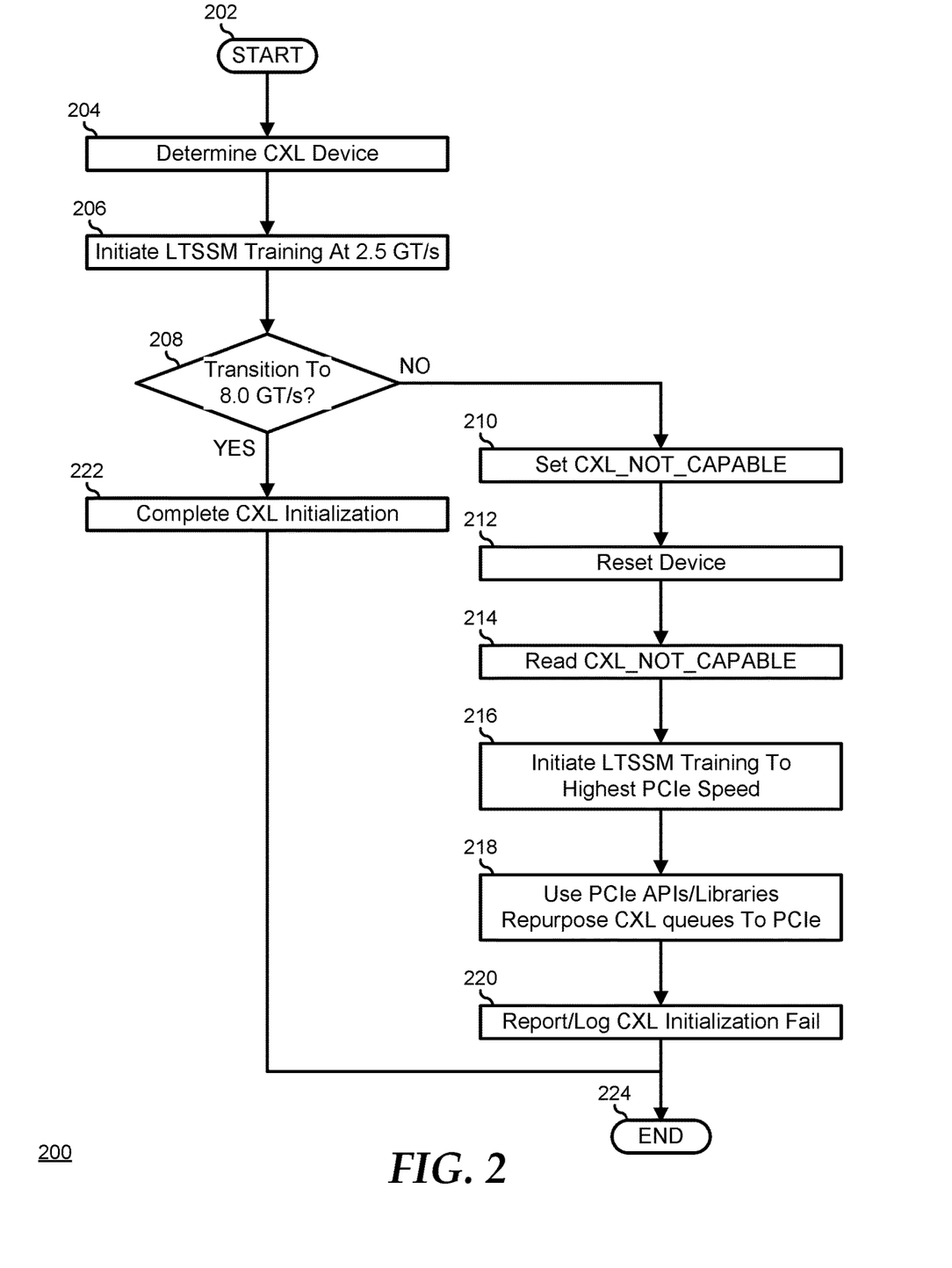
FIG. 2 is a flowchart illustrating a PCIe fallback for a failing CXL device according to an embodiment of the current disclosure.

FIG. 2 illustrates a method 200 for PCIe fallback in the initialization of a CXL device in an information handling system, starting at block 202. The host information handling system determines that a device is a CXL device during a PCIe device initialization phase for the device in block 204. If the device is not determined to support the CXL standard, then the initialization of the device proceeds with a PCIe initialization process, as needed or desired. The host system initiates link training on the PCIe link to which the CXL is connected in block 206. The host system initiates a Link Training and Status State Machine (LTSSM) block to check each lane of the PCIe link. The details of the LTSSM block execution and link training are known in the art and will not be further described herein, except as may be needed to illustrate the current embodiments. The host, having determined that the device supports the CXL standard in block 204, commits to initiate link training at 2.5 GT/s or greater.

A decision is made as to whether or not the link training successfully transitioned to 8.0 GT/s or higher in decision block 208. The CXL standard may require that CXL devices successfully train at 8.0 GT/s or higher. As such, if the link successfully trained at 8.0 GT/s or higher, then the link is determined to support the CXL device signaling rates, and the "YES" branch of decision block 208 is taken. Otherwise, if the link did not successfully train at 8.0 GT/s or higher, then the link is determined to have failed to support the CXL device signaling rates, and the "NO" branch of decision block 208 is taken. When the link did not successfully train at 8.0 GT/s or higher, and the "NO" branch of decision block 208 is taken, a flag bit is set that indicates that the device is not capable of supporting CXL device signaling rates (CXL_NOT_CAPABLE) in block 210. The flag bit may be located in a temporary memory location of the host, or in a temporary memory location of the device, as needed or desired. In this way, the setting of the flag bit (CXL_NOT_CAPABLE) provides an indication that the device is not capable of supporting CXL device signaling rates through subsequent device reset procedures, as described below.

The host system resets the device and initiates a re-training of the link in block 212. Block 212 and subsequent blocks represent a difference from the typical CXL device initialization process. As noted, when a CXL device fails to successfully train at 8.0 GT/s or higher, further link training is halted and the CXL device is not utilized in the host system in any capacity. Thus block 212 represents the initiation of a PCIe fallback for failing CXL devices, as described further below. The host reads the flag bit (CXL_NOT_CAPABLE) in block 214. The host reads the flag bit from the temporary memory of the host, or the temporary memory of the CXL device, as needed or required. The flag bit (CXL_NOT_CAPABLE) indicates to the host system that subsequent initialization processes should proceed in accordance with a PCIe standard, and not in accordance with a CXL standard.

The host system initiates link training on the PCIe link in block 216. The host system initiates the LTSSM block to check each lane of the PCIe link, and the link is trained to the highest possible signaling rate supported by the device. In a particular embodiment, the retraining of the link may include re-training at lower link widths, as needed or desired. For example, where a ×16 link is only trainable at 2.5 GT/s, but derating the link width to a ×8 link results in a link that is trainable at 8.0 GTs, it may be deemed to be more desirable to move forward with the ×8 link, as needed or desired.

Once the link is trained in block 216, the host system ascribes PCIe Application Program Interfaces (APIs) and libraries to the device, and repurposes any CXL queues assigned to the device as PCIe queues to support the device in the PCIe mode of operation in block 218. The device will move forward without the use of any CXL based functions or features, but may still be accessed as a PCIe device with degraded performance from the CXL mode. In a particular embodiment, the host system includes a PCIe driver associated with the PCIe functions of the CXL device. In this embodiment, the host system utilizes the PCIe driver in accessing the CXL device.

The failure of the CXL device to initialize in the CXL mode, and the subsequent retraining in the PCIe mode is reported and logged in block 220. The host system may include a native log to which the CXL initialization failure is logged. Further, the information handling system may include a management function, such as may be implemented by a baseboard management controller (BMC) or the like, which may log the CXL initialization failure to a management log of the information handling system or to a management system associated with the information handling system, as needed or desired. After logging the CXL initialization failure in block 220, the method ends in block 224. Returning to decision block 208, when the link successfully trained at 8.0 GT/s or higher, and the "YES" branch of decision block 208 is taken, the remaining steps associated with a CXL device training are taken in block 222. The steps associated with a CXL device training are known in the art and will not be further described herein, except as needed to illustrate the current embodiments. After the CXL device is fully trained, the method ends in block 224. As described, the indication that the device is not capable of supporting CXL device signaling rates (CXL_NOT_CAPABLE) is described as a flag bit. However, an indication that a device is not capable of supporting CXL device signaling rates may include a field of bits that convey additional information. For example, an indication field may include a number of bits for conveying a highest trained signaling rate, or other information, as needed or desired.

Figure 3:
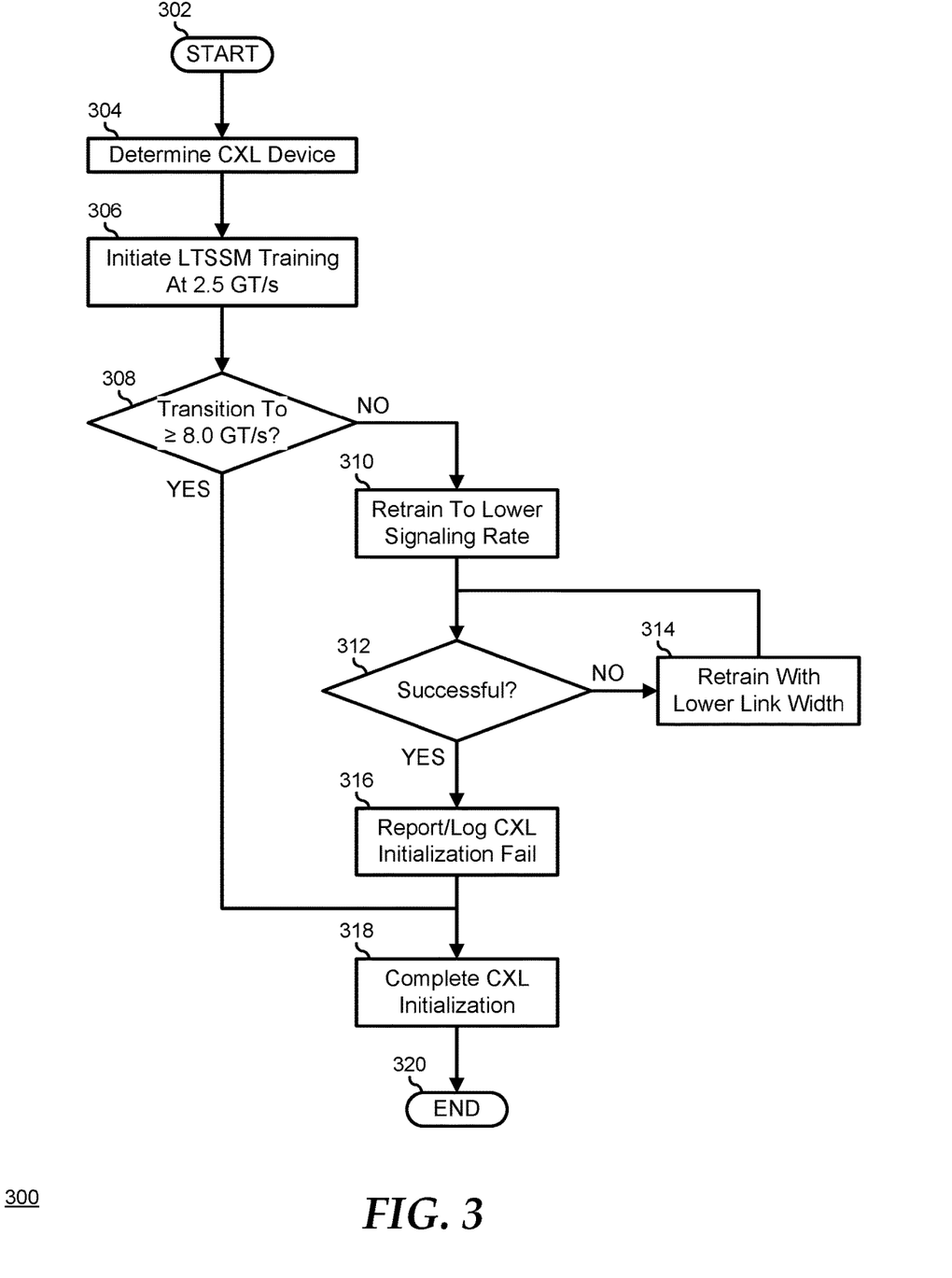
FIG. 3 is a flowchart illustrating a CXL fallback for a failing CXL device according to an embodiment of the current disclosure and FIG. 4 is a block diagram illustrating a generalized information handling system according to another embodiment of the present disclosure.

FIG. 3 illustrates a method 300 for CXL fallback in the initialization of a CXL device in an information handling system, starting at block 302. The host information handling system determines that a device is a CXL device during a PCIe device initialization phase for the device in block 304. If the device is not determined to support the CXL standard, then the initialization of the device proceeds with a PCIe initialization process, as needed or desired. The host system initiates link training on the PCIe link to which the CXL device is connected in block 306. The host system initiates a LTSSM block to check each lane of the PCIe link. The host, having determined that the device supports the CXL standard in block 304, commits to initiate link training at 2.5 GT/s or greater.

A decision is made as to whether or not the link training successfully transitioned to 8.0 GT/s or higher in decision block 308. The CXL standard may require that CXL devices successfully train at 8.0 GT/s or higher. As such, if the link successfully trained at 8.0 GT/s or higher, then the link is determined to support the CXL device signaling rates, and the "YES" branch of decision block 308 is taken. Otherwise, if the link did not successfully train at 8.0 GT/s or higher, then the link is determined to have failed to support the CXL device signaling rates, and the "NO" branch of decision block 308 is taken. When the link did not successfully train at 8.0 GT/s or higher, and the "NO" branch of decision block 308 is taken, and the host system initiates link training on the CXL link at lower signaling rates in block 310. The host system initiates the LTSSM block to check each lane of the PCIe link, and the link is trained to the highest possible signaling rate supported by the device. The failure of the CXL device to initialize in the CXL mode, and the subsequent steps as described with regard to block 310 and following, represents a departure from current CXL specifications that require the failure of device initialization to the rated CXL signaling rates to result in a complete failure and disabling of the device.

After the host system initiates link training on the CXL link at lower signaling rates in block 310, a decision is made as to whether or not the retraining of the CXL link at slower signaling rates was successful in decision block 312. It may be understood that a particular portion of the CXL standard may necessitate a minimum supported link width, or a minimum signaling rate. Decision block 312 may represent a particular link width or signaling rate threshold, as needed or desired. When the retraining of the CXL link at the slower signaling rates was not successful, the "NO" branch of decision block 312 is taken, and the CXL link is retrained with a lower link width setting in block 314. For example, where the CXL standard has a minimum link width requirement, and where a ×16 link is only trainable at 2.5 GT/s, but derating the link width to a ×8 link results in a link that is trainable at 8.0 GTs, it may be deemed to be more desirable to move forward with the ×8 link, as needed or desired. The retraining of the CXL link in block 314 is looped back through decision block 312 to determine if the training was successful, and successively lower link widths are attempted until the retraining of the CXL link is successful, and the "YES" branch of decision block 312 is taken. Note here that, if no retraining at any link width is successful, then the method will exit the loop (not illustrated) and proceed to block 316, as described below.

When either the retraining of the CXL link at the slower signaling rates was successful, and the "YES" branch of decision block 312 is taken, or the CXL link is retrained with the lower link width in block 314, and the "YES" branch of decision block 312 is taken, or the retraining of the CXL link is not successful at any link width, then the failure of the CXL device to initialize at the specified signaling rate or link width, as provided by blocks 310 to 314, is reported and logged in block 316. The host system may include a native log to which the CXL initialization failure is logged. Further, the information handling system may include a management function, such as may be implemented by a BMC or the like, which may log the CXL initialization failure to a management log of the information handling system or to a management system associated with the information handling system, as needed or desired. Returning to decision block 308, when the link successfully trained at 8.0 GT/s or higher, and the "YES" branch of decision block 308 is taken, or when the failure of the CXL device to initialize at the specified signaling rate or link width, as provided by blocks 310 to 314, is reported and logged in block 316, the remaining method steps associated with a CXL device training are taken in block 318, and the method ends in block 320.

Figure 4:
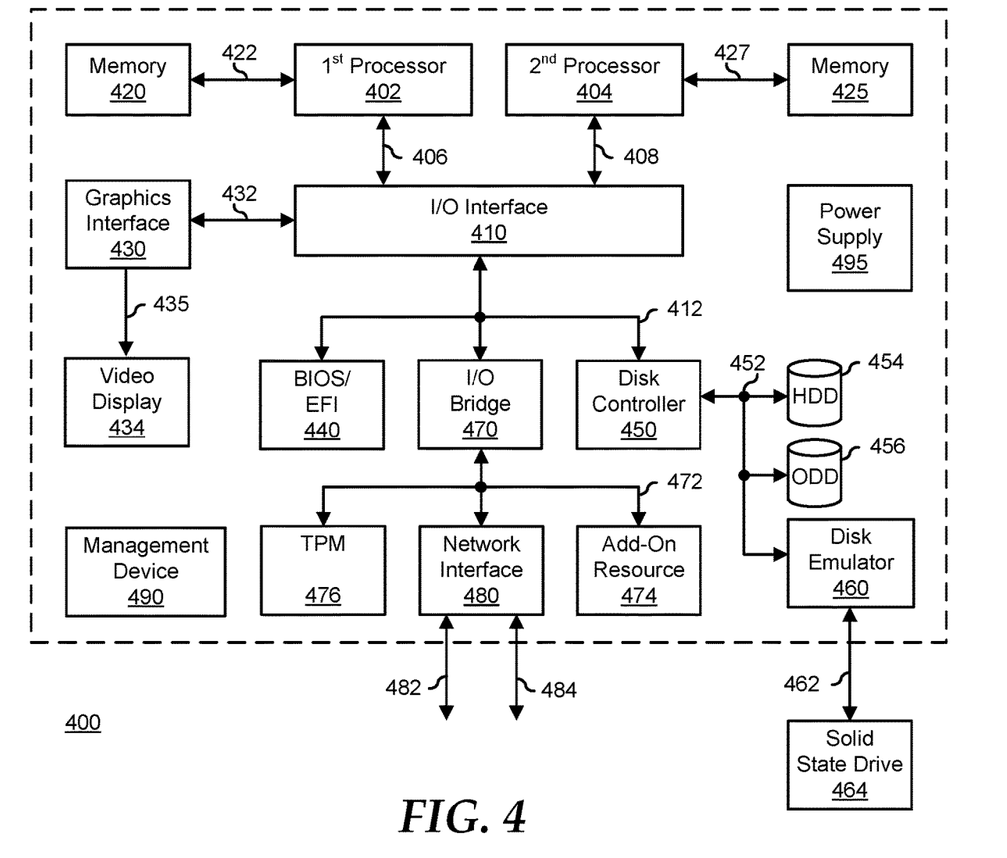

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor; and
a compute express link (CXL) device coupled to the processor by a peripheral component interface-express (PCIe)/CXL link;
wherein the processor is configured to initiate a link training on the PCIe/CXL link, to determine that the PCIe/CXL link failed to train to a first data rate, to train the PCIe/CXL link to a second data rate in response to determining that the PCIe/CXL link failed to train to the first data rate, and to operate the CXL device in a PCIe mode in response to training the PCIe/CXL link to the second data rate.

2. The information handling system of claim 1, wherein the first data rate includes a first signaling rate of the PCIe/CXL link and the second data rate includes a second signaling rate of the PCIe/CXL link, and wherein the second signaling rate is lower than the first signaling rate.

3. The information handling system of claim 2, wherein the first signaling rate is greater than or equal to eight (8) giga-transfers per seconds (GT/s).

4. The information handling system of claim 3, wherein the second signaling rate is less than eight (8) GT/s.

5. The information handling system of claim 2, wherein the first data rate includes a first link width of the PCIe/CXL link and the second data rate includes a second link width of the CXL/PCIe link, and wherein the second link width is lower than the first link width.

6. The information handling system of claim 5, wherein the first link width includes 16 lanes, and wherein the second link width includes 8 lanes.

7. The information handling system of claim 1, wherein the first data rate includes a first link width of the PCIe/CXL link and the second data rate includes a second link width of the CCXL/PCIe link, and wherein the second link width is lower than the first link width.

8. The information handling system of claim 7, wherein the first link width includes 16 lanes, and wherein the second link width includes 8 lanes.

9. The information handling system of claim 1, wherein in initiating the link training on the PCIe/CXL link, the processor is further configured to initiate a Link Training and Status State Machine (LTSSM) block to check each lane of the PCIe link.

10. The information handling system of claim 1, wherein in response to operating the CXL device in the CXL mode, the processor is further configured to report an error in training the PCIe/CXL link.

11. A method, comprising:
coupling a compute express link (CXL) device of an information handling system to a processor of the information handling system by a peripheral component interface-express (PCIe)/CXL link;

initiating, by the processor, a link training on the PCIe/CXL link;

determining that the PCIe/CXL link failed to train to a first data rate;

training the PCIe/CXL link to a second data rate in response to determining that the PCIe/CXL link failed to train to the first data rate; and operating the CXL device in a PCIe mode in response to training the PCIe/CXL link to the second data rate.

12. The method of claim 11, wherein the first data rate includes a first signaling rate of the PCIe/CXL link and the second data rate includes a second signaling rate of the PCIe/CXL link, and wherein the second signaling rate is lower than the first signaling rate.

13. The method of claim 12, wherein the first signaling rate is greater than or equal to eight (8) giga-transfers per seconds (GT/s).

14. The method of claim 13, wherein the second signaling rate is less than eight (8) GT/s.

15. The method of claim 12, wherein the first data rate includes a first link width of the PCIe/CXL link and the second data rate includes a second link width of the CXL/PCIe link, and wherein the second link width is lower than the first link width.

16. The method of claim 15, wherein the first link width includes 16 lanes, and wherein the second link width includes 8 lanes.

17. The method of claim 11, wherein the first data rate includes a first link width of the PCIe/CXL link and the second data rate includes a second link width of the CXL/PCIe link, and wherein the second link width is lower than the first link width.

18. The method of claim 17, wherein the first link width includes 16 lanes, and wherein the second link width includes 8 lanes.

19. The method of claim 11, wherein in initiating the link training on the PCIe/CXL link, the method further comprises initiating a Link Training and Status State Machine (LTSSM) block to check each lane of the PCIe link.

20. An information handling system, comprising:
a processor; and
a compute express link (CXL) device coupled to the processor by a peripheral component interface-express (PCIe)/CXL link;
wherein the processor is configured to initiate a link training on the PCIe/CXL link, to determine that the PCIe/CXL link failed to train to a first data rate, to train the PCIe/CXL link to a second data rate in response to determining that the PCIe/CXL link failed to train to the first data rate, to operate the CXL device in a CXL mode in response to training the PCIe/CXL link to the second data rate, and to report an error in training the PCIe/CXL link in response to operating the CXL device in the PCIe mode, wherein the first data rate includes a first signaling rate of the PCIe/CXL link and the second data rate includes a second signaling rate of the PCIe/CXL link, and wherein the second signaling rate is lower than the first signaling rate.

* * * * *